No. 625,605. Patented May 23, 1899.
G. E. RIDGWAY.
APPARATUS FOR DISCHARGING SEWAGE, &c., UPON FILTER BEDS.
(Application filed Feb. 1, 1899.)
(No Model.) 8 Sheets—Sheet 1.
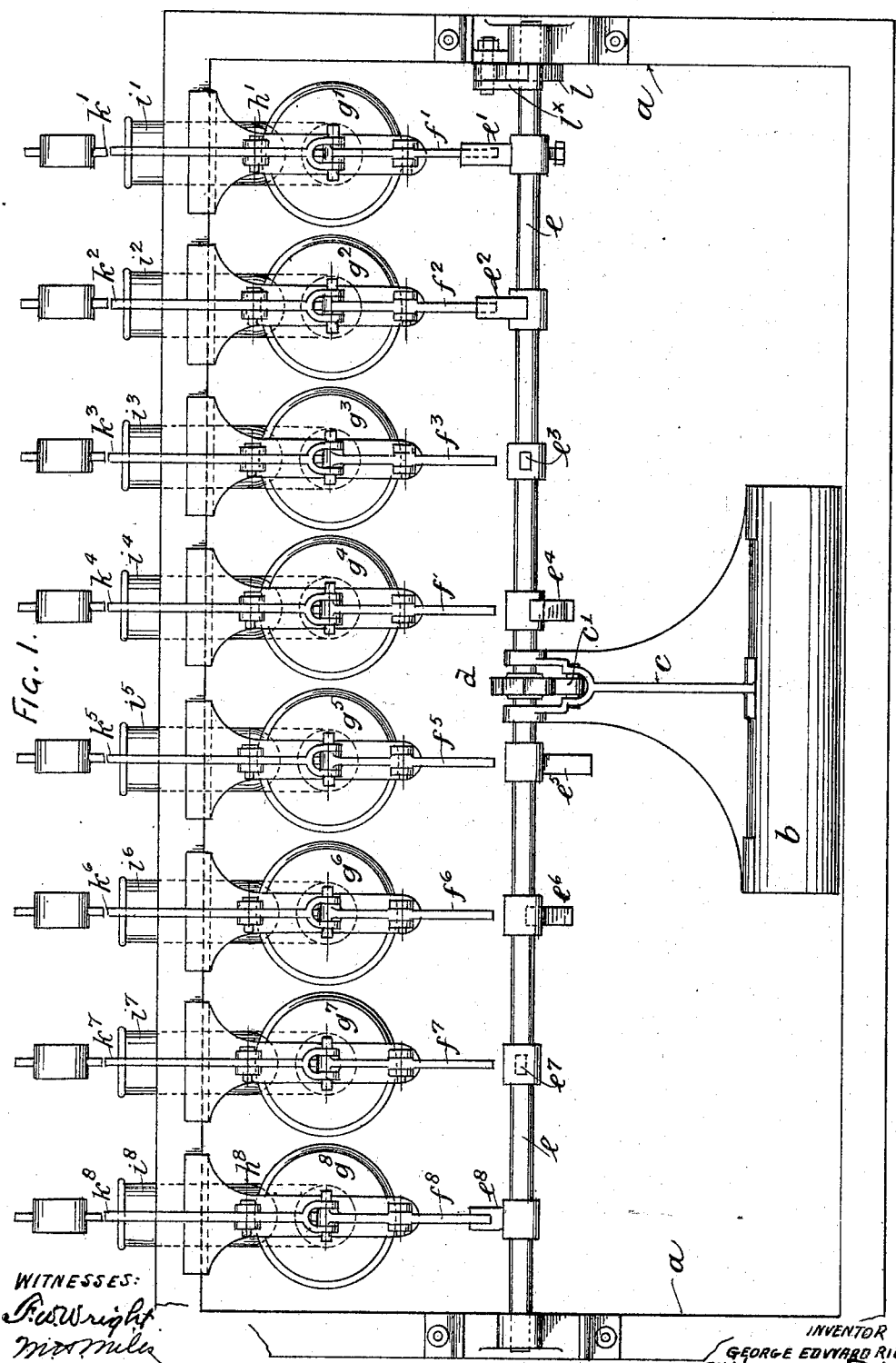

No. 625,605. Patented May 23, 1899.
G. E. RIDGWAY.
APPARATUS FOR DISCHARGING SEWAGE, &c., UPON FILTER BEDS.
(Application filed Feb. 1, 1899.)
(No Model.) 8 Sheets—Sheet 2.
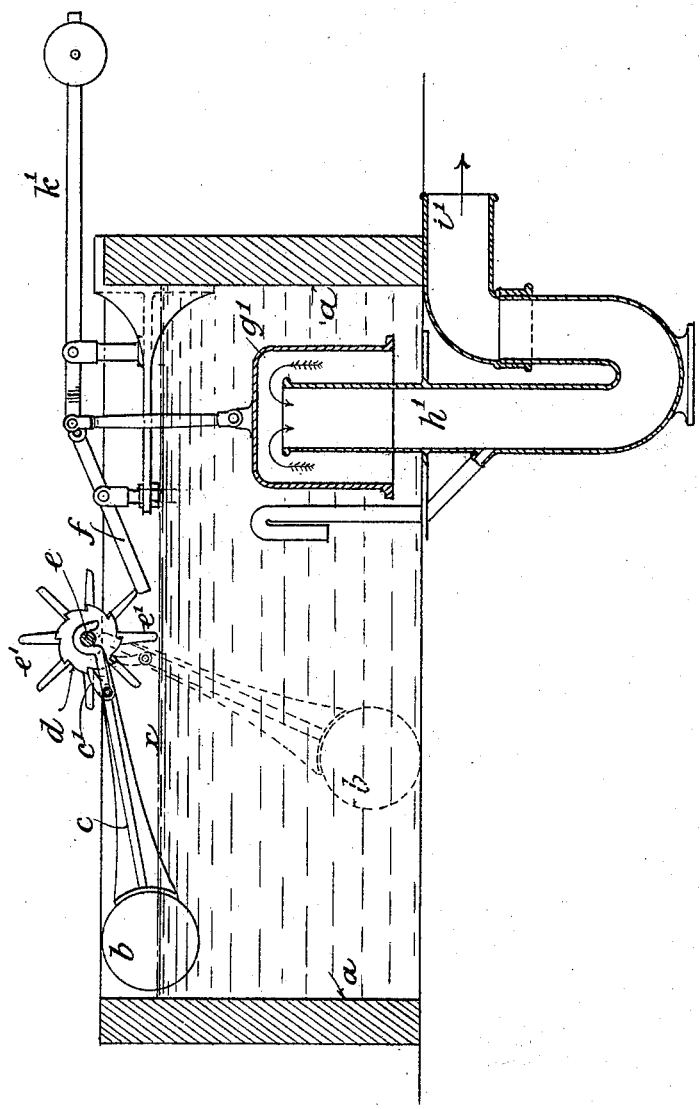
WITNESSES:
INVENTOR
GEORGE EDWARD RIDGWAY
BY Howson and Howson
HIS ATTORNEYS.

No. 625,605. Patented May 23, 1899.
G. E. RIDGWAY.
APPARATUS FOR DISCHARGING SEWAGE, &c., UPON FILTER BEDS.
(Application filed Feb. 1, 1899.)
(No Model.) 8 Sheets—Sheet 3.
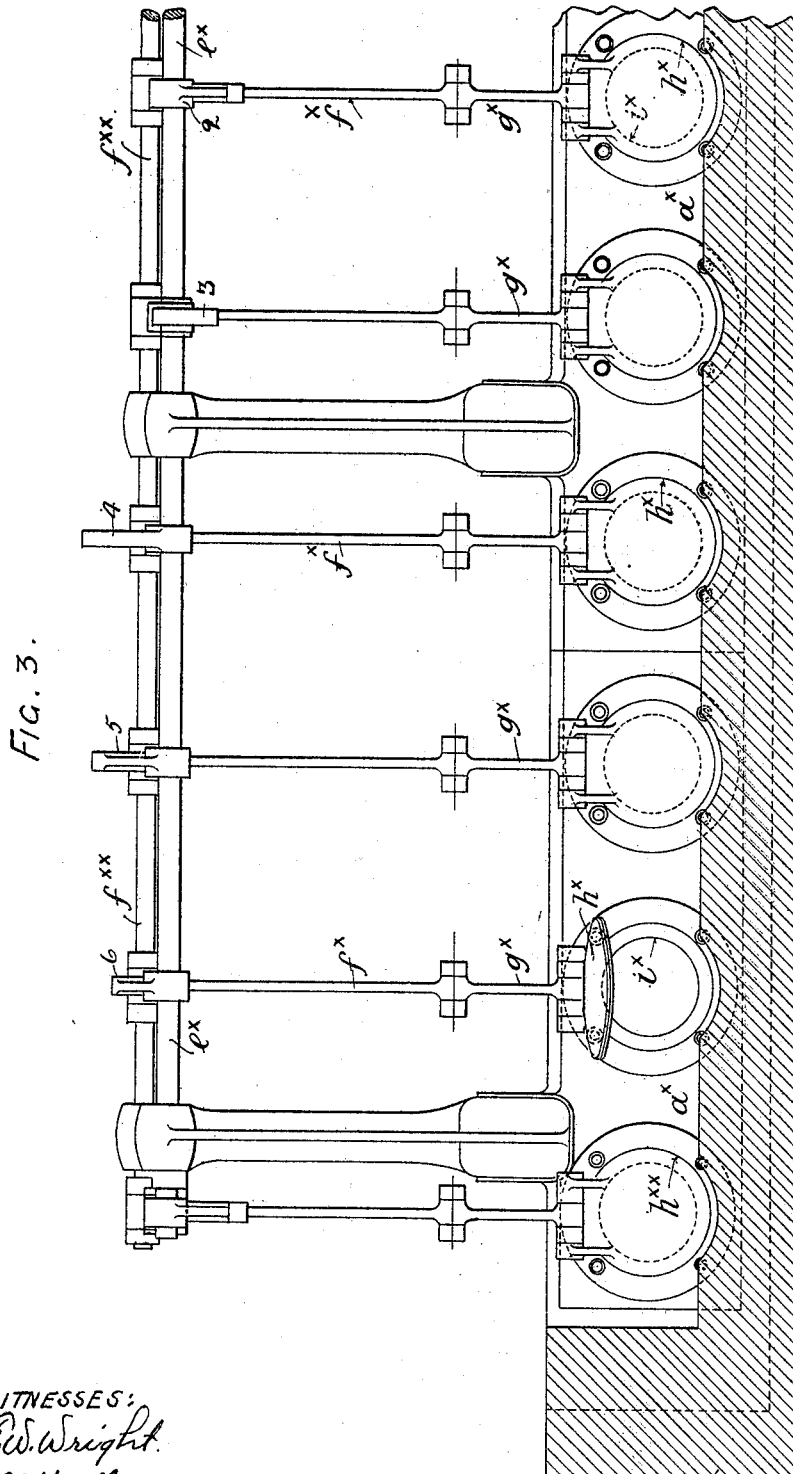
WITNESSES:
P. W. Wright
M. H. Miles
INVENTOR
GEORGE EDWARD RIDGWAY
BY
Howson and Howson
HIS ATTORNEYS

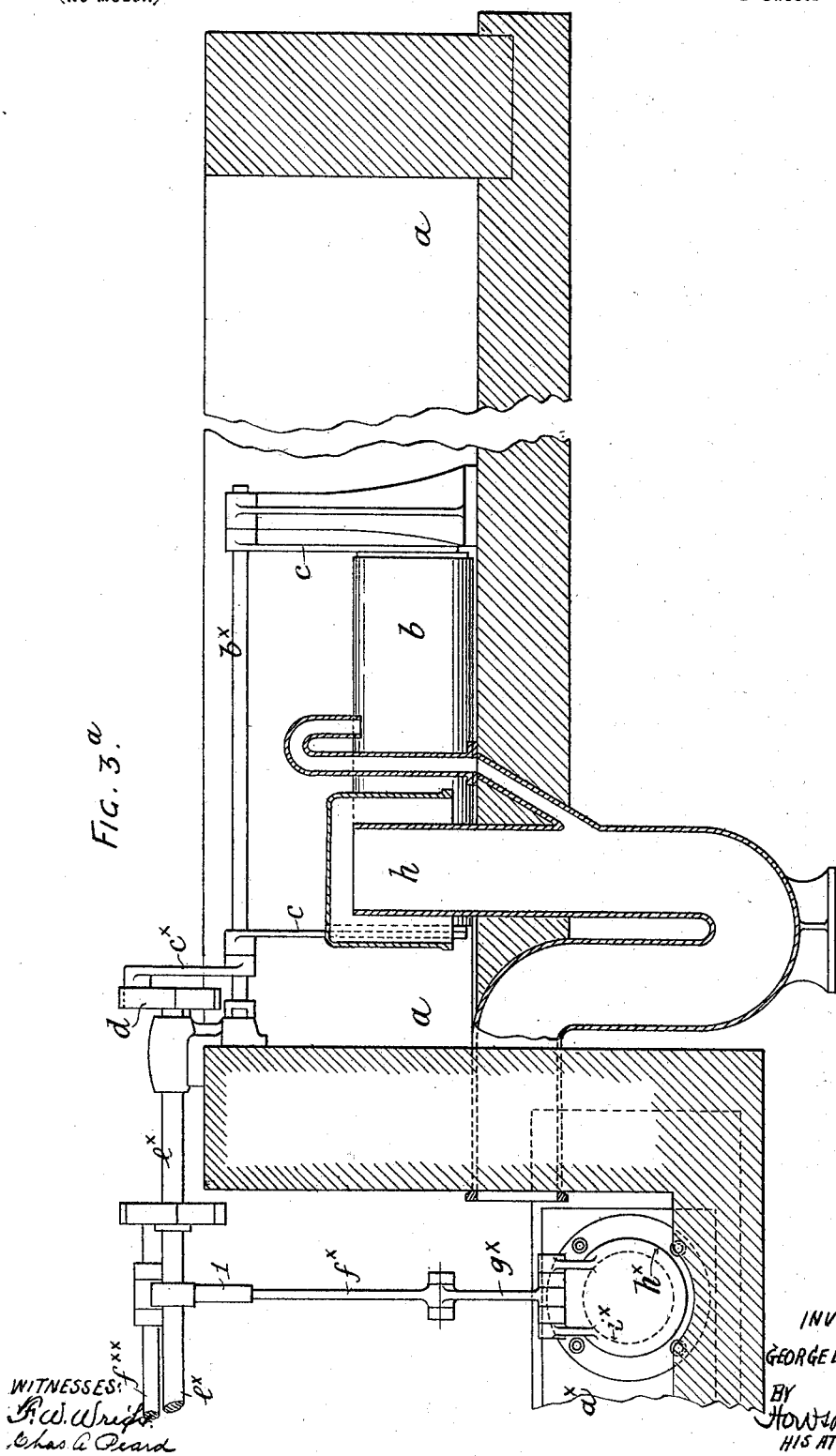

No. 625,605. Patented May 23, 1899.
G. E. RIDGWAY.
APPARATUS FOR DISCHARGING SEWAGE, &c., UPON FILTER BEDS.
(Application filed Feb. 1, 1899.)
(No Model.) 8 Sheets—Sheet 5.
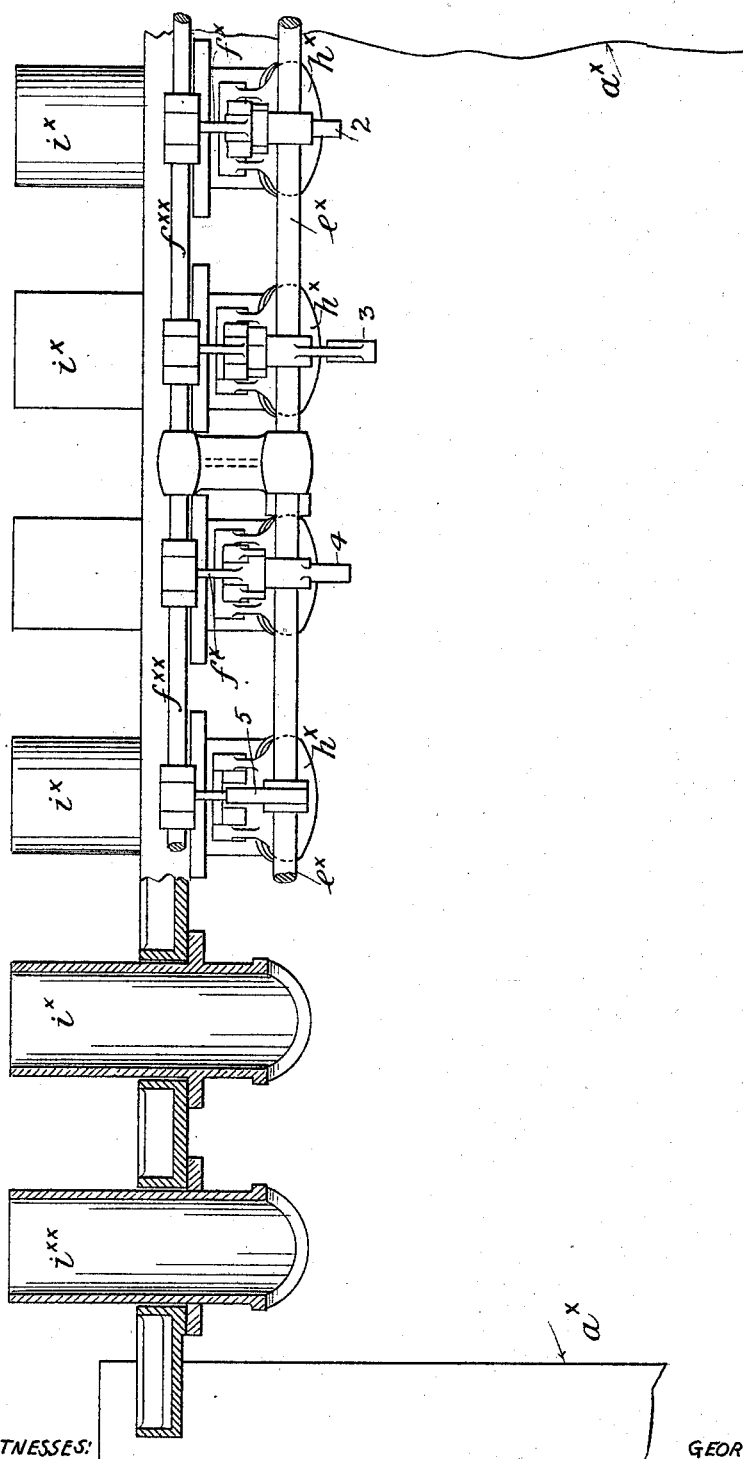
WITNESSES:
INVENTOR
GEORGE EDWARD RIDGWAY
BY
HIS ATTORNEYS.

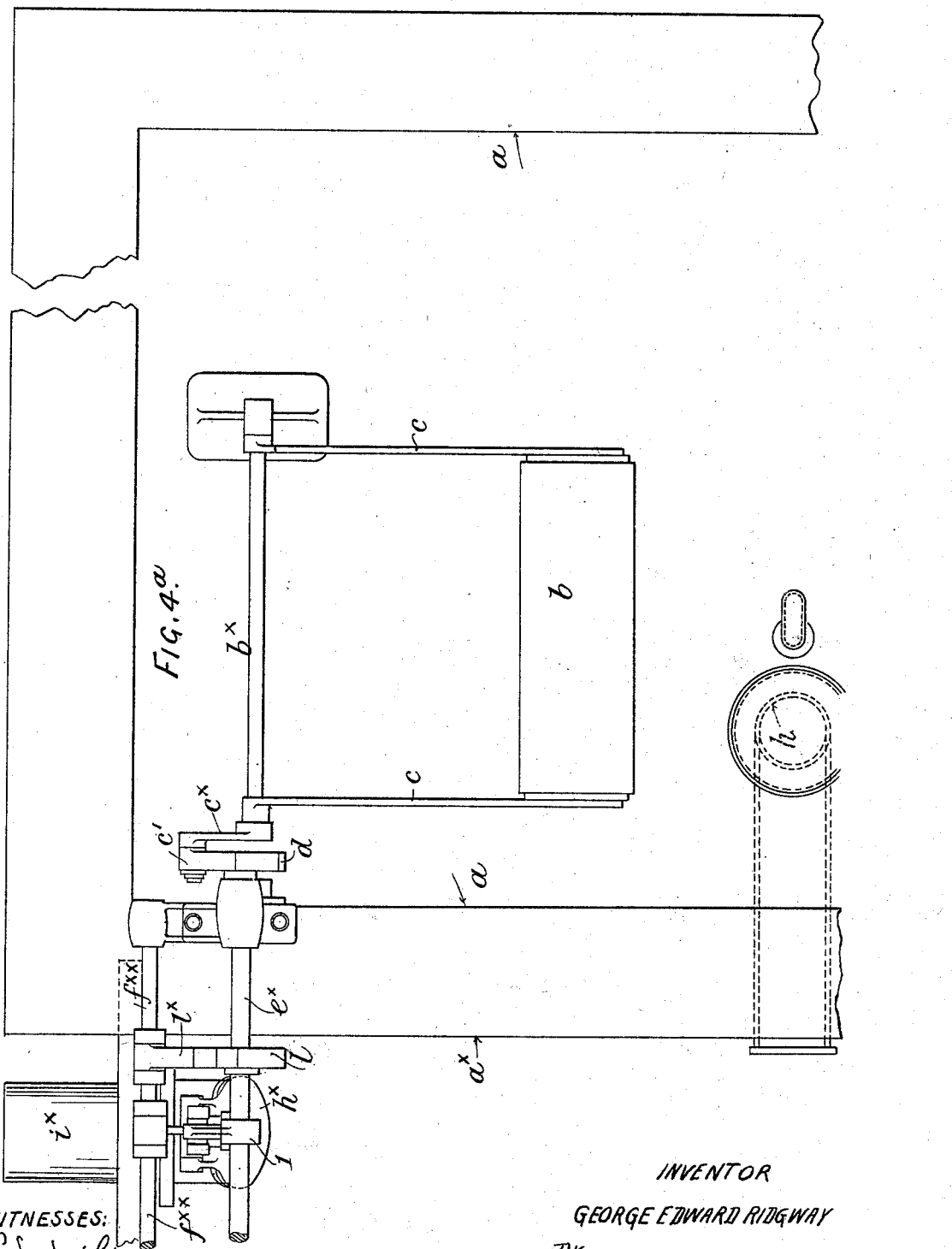

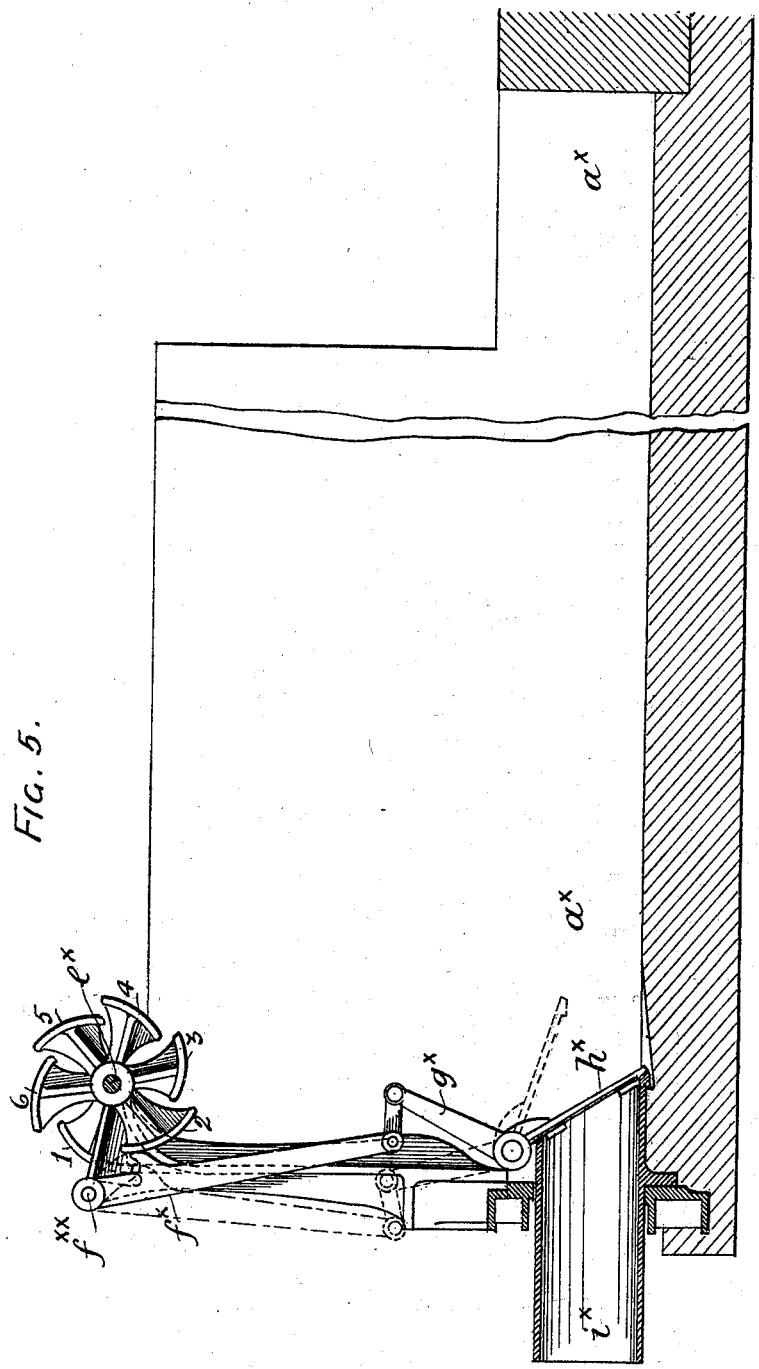

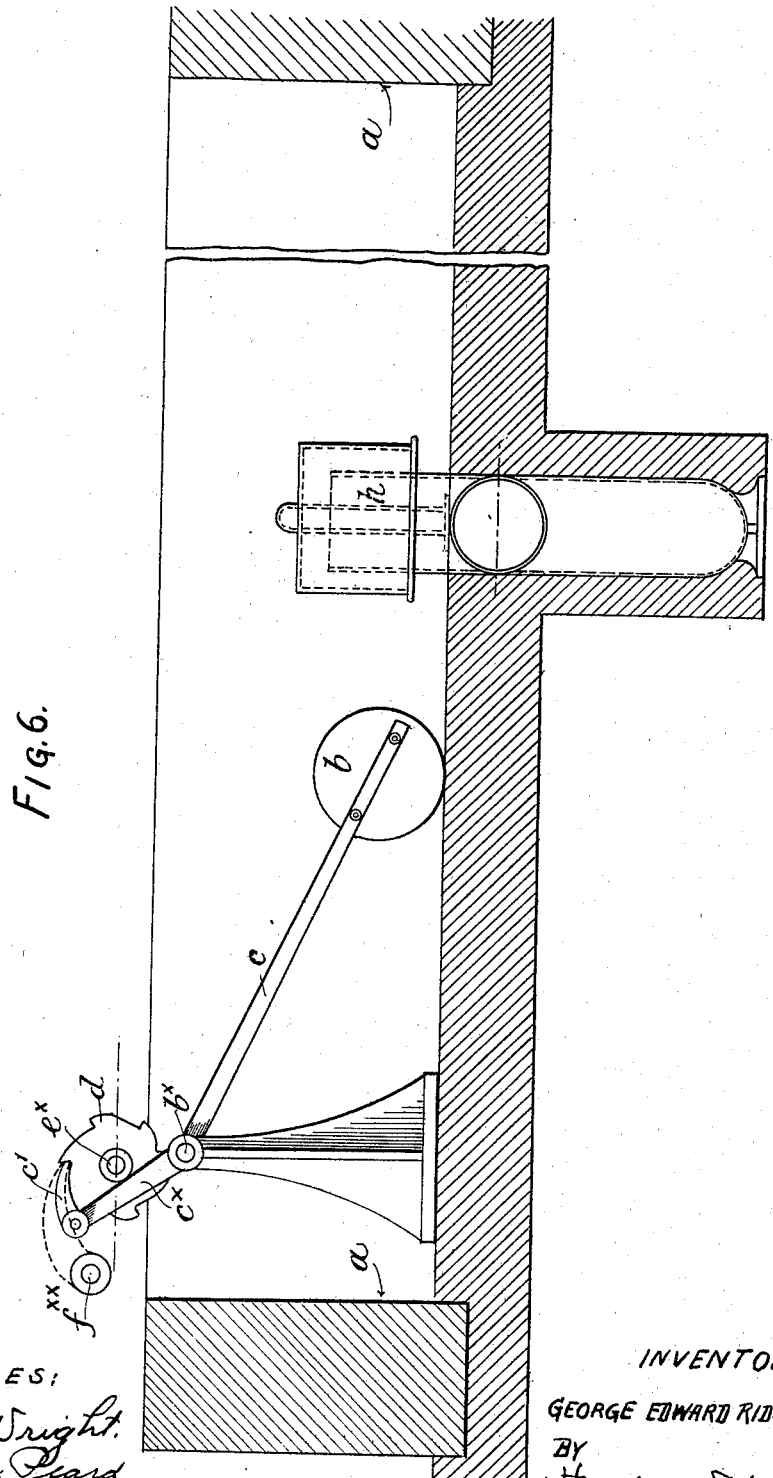

UNITED STATES PATENT OFFICE.

GEORGE EDWARD RIDGWAY, OF ASHLEY, ENGLAND.

APPARATUS FOR DISCHARGING SEWAGE, &c., UPON FILTER-BEDS.

SPECIFICATION forming part of Letters Patent No. 625,605, dated May 23, 1899.

Application filed February 1, 1899. Serial No. 704,131. (No model.)

*To all whom it may concern:*

Be it known that I, GEORGE EDWARD RIDGWAY, a subject of the Queen of Great Britain, residing at Ashley, in the county of Chester, England, have invented new and useful Improvements in Apparatus for the Distribution of Fluids, Particularly Applicable for Discharging Sewage or other Foul Liquids Upon Filter-Beds, of which the following is a specification.

This invention relates to improvements in apparatus for the intermittent and automatic distribution of fluids in general, and is particularly applicable to apparatus for receiving either by a constant or intermittent flow or supply the effluent from any kind of sewage-tank or sewage-works or the like, or waste liquors from any kind of manufacturing process or the like, or water from any natural or artificial source whatever requiring filtration, and for intermittently and automatically feeding or discharging the same onto the surface of a series of filters in certain definite quantities and in regular sequence, whereby a great economy of labor is effected and a more perfect action of the filters is secured and the requisite amount of rest for aeration is allowed.

The apparatus consists, in the first place, of a tank or chamber of definite capacity (which I call the "siphoning-chamber") into which the fluid—say the effluent waste liquor or water—is allowed to flow and from which it is automatically discharged and distributed—say to the filter-beds—by means of several siphons or valves as soon as it reaches a certain fixed level in the aforesaid chamber. In some cases I arrange in the interior of the said tank or siphoning-chamber itself a row or series of siphons or suitable valves each provided with a separate exit-pipe leading to, say, one of the filter-beds. When siphons are used, a convenient way of causing the said siphons to act automatically is to arrange in connection therewith a shaft provided with a series of arms or tappets acting upon levers or the like connected to the said siphons in such a way that as the said tappet-shaft revolves it will open the said siphons, either *seriatim* or otherwise, and rapidly discharge the contents of the chamber through one or more of the siphons to the corresponding filtering-beds or to any other desired receptacles. The said tappet-shaft may be caused to act automatically, so as to discharge the contents of the tank or chamber as soon as the liquid rises to a certain definite level, by keying or otherwise fixing on the said shaft a ratchet-wheel having, preferably, as many teeth as there are siphons and hanging on the said shaft a lever provided with a ratchet or dog and with a float so arranged as to move the ratchet-wheel and the shaft one tooth each time the tank becomes full.

The siphons are each provided with a counterbalanced lever, and as the tappet-shaft revolves one of its arms or tappets acts upon one of these counterbalanced levers and causes it to raise the dome of the corresponding siphon and empty out the contents of the chamber. As the liquid flows out the float descends, causing the ratchet or dog of the float-lever to take up a fresh tooth of the ratchet-wheel, and as the float rises again it releases the first tappet and brings a fresh tappet into action, and when the liquid has attained the proper level again it opens another siphon and distributes the contents of the tank or chamber to a fresh filter-bed or receptacle, and so on. It will be obvious that by arranging the positions of the tappets or arms accordingly the apparatus may be made to open a series of siphons or valves *seriatim*, singly or in pairs or otherwise, as may be desired, the object in applying the invention to the filtration of sewage being that each filter shall be allowed a certain amount of rest to aerate the filter after it has performed its work before a fresh supply of liquid to be filtered is distributed therein; or the same result of intermittent and automatic distribution of fluids may be obtained by the use of a separate chamber containing a siphon working automatically, so as to discharge its contents intermittently into a second chamber provided with the distributing-valves, the tappet-shaft of which is actuated by a ratchet or equivalent device and a lever connected with a float in the said siphon-chamber or in a chamber connected therewith in such a way that the rising and falling of the level in the siphoning-chamber shall cause the intermittent distribution of the fluid into a series of channels for conveying the same to its desired destination.

The manner in which my invention may be carried into practical effect will be readily understood on reference to the accompanying drawings and the following description thereof.

On Sheet 1 Figure 1 is a plan view, and on Sheet 2 Fig. 2 a transverse section, and Fig. $2^a$ a detached part, hereinafter described, of a siphoning-chamber made according to the first-above-described modification of this invention. On Sheets 3 and 4 Figs. 3 and $3^a$ are together a complete longitudinal section of siphoning and distributing chambers combined according to the modification of this invention last above described, and Figs. 4 and $4^a$ on Sheets 5 and 6 show together a partial plan, partly in section, of this arrangement. On Sheets 7 and 8 Figs. 5 and 6 are transverse sections through the distributing-chamber and siphoning-chamber, respectively.

Referring to Sheets 1 and 2, $a$ is the siphoning-chamber, in which the level of the fluid rises, say, to the dotted line X, raising the float $b$ into the position shown by the full lines. The float $b$ is carried by the lever $c$, which is provided with a pivoted catch $c'$, acting on a ratchet-wheel $d$. This wheel $d$ is fast on the shaft $e$, which is provided with tappets $e'$ $e^2$ $e^3$ $e^4$ $e^5$ $e^6$ $e^7$ $e^8$, so set thereon with regard to the eight teeth of the ratchet-wheel as to act in succession (as the said wheel is intermittently moved) upon the corresponding arms or levers $f'$ $f^2$ $f^3$ $f^4$ $f^5$ $f^6$ $f^7$ $f^8$. These arms act on the domes $g'$ $g^2$ $g^3$ $g^4$ $g^5$ $g^6$ $g^7$ $g^8$ of suitable siphons, such as $h'$, Fig. 2, communicating with outlets $i'$ $i^2$ $i^3$ $i^4$ $i^5$ $i^6$ $i^7$ $i^8$, leading to the several (in this case eight) filters or other places which are to be supplied in turn with the fluid. $k'$ $k^2$ $k^3$ $k^4$ $k^5$ $k^6$ $k^7$ $k^8$ are weighted levers assisting the raising of the domes $g'$ $g^2$ $g^3$ $g^4$ $g^5$ $g^6$ $g^7$ $g^8$ by the tappets $e'$ $e^2$ $e^3$ $e^4$ $e^5$ $e^6$ $e^7$ $e^8$. $l$ (see Figs. 1 and $2^a$) is a ratchet similar to $d$ and provided with a fixed catch $l^{\times}$ to prevent the backward motion of the shaft. Thus at the first charge of the chamber $a$ with fluid as soon as the float-level has risen to $x$ the dome $g'$ will be raised by the tappet $e'$ and levers $f'$ $k'$ to such a height that the fluid can flow over the top of the siphon $h'$ to the outlet $i'$, and the chamber will be emptied. The float will then drop to the position shown by dotted lines, and the catch $c'$ will engage with a second tooth on the ratchet-wheel $d$, so as to partly rotate the shaft $e$ again at the next charge of the chamber $a$ with fluid and after first releasing the dome $g'$ raise the dome $g^2$ of the siphon $h^2$ to discharge the contents of $a$ (when full again) through the outlet $i^2$, and so on.

It will be evident that by readjusting the positions of the tappets on the shaft $e$ the order of the action of the siphons can be altered as desired.

Referring now to Figs. 3, $3^a$, 4, $4^a$, 5, and 6 on Sheets 3, 4, 5, and 6, the siphoning-chamber $a$ is in this case only provided with one siphon $h$, of suitable construction, automatically delivering the contents of the chamber $a$, when full, to a distributing-chamber $a^{\times}$, provided with a series of outlets $i^{\times}$. The levers or arms $c$, carrying the float $b$ in the siphoning-chamber $a$, are mounted on a shaft $b^{\times}$, separate from the shaft $e^{\times}$, which is mounted above the chamber $a^{\times}$, and (like the shaft $e$ above described) carries a series of—say six—tappets 1 2 3 4 5 6, acting one after the other on a series of arms or levers $f^{\times}$, connected or linked to levers $g^{\times}$, fitted to pivoted valves $h^{\times}$, closing the outlets $i^{\times}$. I prefer to mount the levers $f^{\times}$ loosely on one long bar or rod $f^{\times\times}$, parallel with the shaft $e^{\times}$. The shaft $b^{\times}$ is provided with an arm $c^{\times}$, carrying the catch $c'$, which works the ratchet-wheel $d$ on the shaft $e^{\times}$. The first catch $l^{\times}$ (acting on the ratchet-wheel $l$ in the same manner as in the modification shown on Figs. 1 and $2^a$) may be carried by the rod or bar $f^{\times\times}$, as shown.

The action of this apparatus is as follows: Before the first charge of the chamber $a$ with fluid the float $b$ and arms or levers $c$ $c^{\times}$ and catch are in such position that the ratchet-wheel $d$ holds the shaft $e^{\times}$ so that the tappet 1 has moved the first of the series of arms $f^{\times}$ and raised the first of the valves $h^{\times}$, as shown in dotted lines on Fig. 5, and so has opened the first of the outlets $i^{\times}$, so that as soon as the siphoning-chamber $a$ is full and the automatic siphon $h$ discharges the contents thereof into the distributing-chamber $a^{\times}$ the fluid can escape through this last-named valve and outlet to the first filter or place to which it is to be conveyed. The fall of the level of the fluid in the chamber $a$ will cause tappet 1 to allow the first valve to close its outlet and tappet 2 to raise the second valve and open the second outlet, ready for the second charge and discharge of the fluid.

It will be observed on Figs. 3 and 4 that there is an additional or relief valve $h^{\times\times}$ and outlet $i^{\times\times}$ fitted in the distributing-chamber $a^{\times}$; but these are not used in the ordinary course of work. Their levers, however, may be provided with a tappet on the shaft $e^{\times}$ should any valve require repair or should it be desired to divert the fluid from one or more of the filters or places supplied by the valves $h^{\times}$ and outlets $i^{\times}$. I prefer to make the outlet side of the distributing-chamber $a^{\times}$ of cast metal, so that the valves and outlets can be accurately applied to the chamber, as illustrated by the drawings.

By this invention the valves or siphons are worked by the rise and fall of the level of the fluid in the siphoning collecting chamber or tank and not by the rush or force of the flow of the fluid.

I claim as my invention—

1. Apparatus for distributing liquid consisting of a tank, a number of openings connected with the tank, means operated by the rise and fall of the liquid in said tank adapted to successively open different openings on the successive rise and fall of the liquid, as and for the purpose described.

2. Apparatus for distributing liquid, consisting of a tank, a number of openings connected with the tank, a float in said tank, a rod carrying means for opening different openings at different stages of its rotation, said float adapted to operate said rod, as and for the purpose described.

3. Apparatus for distributing liquid, consisting of a tank, a number of openings connected with the tank, a float in said tank, a rod carrying means for opening different openings at different stages of its rotation, pawl-and-ratchet connections between the float and the rod, as and for the purpose described.

4. Apparatus for distributing liquid, consisting of a tank, a number of openings connected with the tank, a float in said tank, a rod carrying means for opening different openings at different stages of its rotation, pawl-and-ratchet connections between the float and the rod, and another pawl and ratchet to prevent the opening means from turning back, substantially as described.

5. Apparatus for distributing liquid, consisting of a tank, a number of openings connected with the tank, a float in said tank, a rod carrying means for opening different openings at different stages of its rotation, said float adapted to operate said rod, and siphon connection between said tank and the openings adapted to empty the tank and deliver the liquid to that opening which is open at that stage of the rotation of said rod, substantially as described.

6. An apparatus for distributing liquids, having a tank, a number of siphons in said tank connecting the tank with different outlets, means for successively opening communication between the tank and the successive siphons upon the rise and fall of the liquid in the tank, substantially as described.

7. In an apparatus for distributing liquids, the combination of lever, float and ratchet and tappets, with counterbalanced domes, said tappets adapted to operate said domes through suitable means, substantially as described.

8. In an apparatus for distributing liquids, the combination of lever and float, ratchet and tappets, with lever $f$, counterbalanced domes and siphon, substantially as described.

In testimony whereof I have signed my name to this specification in the presence of two subscribing witnesses.

GEORGE EDWARD RIDGWAY.

Witnesses:
GEORGE DAVIES,
JNO. HUGHES.